(12) United States Patent
Dyrla (10) Patent No.: US 9,157,375 B2
(45) Date of Patent: Oct. 13, 2015

(54) METHOD AND A DEVICE FOR OPTIMIZING THE UTILIZATION OF AN ENGINE

(75) Inventor: Frédéric Dyrla, Bouc Bel Air (FR)

(73) Assignee: Airbus Helicopters, Marignane (FR)

( * ) Notice: Subject to any disclaimer, the term of this patent is extended or adjusted under 35 U.S.C. 154(b) by 923 days.

(21) Appl. No.: 13/204,938

(22) Filed: Aug. 8, 2011

(65) Prior Publication Data
US 2012/0053811 A1    Mar. 1, 2012

(30) Foreign Application Priority Data
Aug. 31, 2010 (FR) ...................................... 10 03478

(51) Int. Cl.
    *F02C 9/00*      (2006.01)
    *F01D 21/14*      (2006.01)
    *F02C 9/28*      (2006.01)

(52) U.S. Cl.
    CPC . *F02C 9/00* (2013.01); *F01D 21/14* (2013.01); *F02C 9/28* (2013.01); *F05D 2220/329* (2013.01); *F05D 2270/11* (2013.01); *F05D 2270/20* (2013.01)

(58) Field of Classification Search
    CPC .............. F01D 21/14; F02C 9/00; F02C 9/28; F05D 2220/329; F05D 2270/11; F05D 2270/20; F05D 2270/053; F05D 2270/303
    USPC ......... 701/3, 8, 9, 14, 29.2, 100; 60/773, 779, 60/793
See application file for complete search history.

(56) References Cited

U.S. PATENT DOCUMENTS

| | | | | |
|---|---|---|---|---|
| 5,363,317 A | * | 11/1994 | Rice et al. | 702/34 |
| 7,031,812 B1 | * | 4/2006 | Pettigrew et al. | 701/14 |
| 7,143,003 B2 | * | 11/2006 | Certain | 702/144 |
| 7,532,970 B1 | * | 5/2009 | Lardillon | 701/100 |
| 7,769,521 B2 | * | 8/2010 | Gaulmin et al. | 701/100 |

(Continued)

FOREIGN PATENT DOCUMENTS

| | | |
|---|---|---|
| DE | 4125372 C1 | 8/1992 |
| EP | 1741901 A1 | 1/2007 |
| FR | 2878288 A1 | 5/2006 |
| FR | 2888287 A1 | 1/2007 |

(Continued)

OTHER PUBLICATIONS
Search Report and Written Opinion; Application No. FR 1003478; dated May 12, 2011.

(Continued)

*Primary Examiner* — Thomas G Black
*Assistant Examiner* — Ce Li
(74) *Attorney, Agent, or Firm* — Brooks Kushman P.C.

(57) ABSTRACT

A method of optimizing the use of an aircraft power plant having at least one engine (1, 1') operating within a performance envelope covering at least a first rating and a second rating, said first rating presenting a first power (P1) usable over a predetermined first time interval (D1), said second rating presenting a second power (P2) greater than said first power (P1), the second power (P2) being usable continuously over a predetermined second time interval (D2). Thus, while the engine (1, 1') is developing a third power (P3) that is both greater than the first power (P1) and less than or equal to the second power (P2), a potential first duration of utilization ($\Delta T$) of continuous use of said second power (P2) is determined and displayed, said first duration of utilization ($\Delta T$) elapsing at a speed that is variable and that depends on said third power (P3).

4 Claims, 1 Drawing Sheet

(56) References Cited

U.S. PATENT DOCUMENTS

| | | | |
|---|---|---|---|
| 2006/0089761 A1* | 4/2006 | Pettigrew et al. | 701/14 |
| 2008/0097703 A1* | 4/2008 | Francois | 702/34 |
| 2008/0125931 A1* | 5/2008 | Gaulmin et al. | 701/29 |
| 2008/0319629 A1* | 12/2008 | Iraudo | 701/100 |
| 2009/0125205 A1* | 5/2009 | Lardillon | 701/100 |
| 2010/0030406 A1* | 2/2010 | Christophe et al. | 701/14 |

FOREIGN PATENT DOCUMENTS

| | | |
|---|---|---|
| WO | 9410619 A1 | 5/1994 |
| WO | 2005120954 A2 | 12/2005 |

OTHER PUBLICATIONS

Canadian Search Report Dated Nov. 22, 2013, application No. 2,749,849, Applicant EUROCOPTER, 3 Pages.

\* cited by examiner

METHOD AND A DEVICE FOR OPTIMIZING THE UTILIZATION OF AN ENGINE

CROSS REFERENCE TO RELATED APPLICATIONS

This application claims the benefit of FR 10 03478 filed on Aug. 31, 2010, the disclosure of which is incorporated in its entirety by reference herein.

BACKGROUND OF THE INVENTION (1) Field of the Invention

The present invention relates to a method and a device for optimizing the utilization of an engine, in particular an engine of an aircraft of the rotorcraft type.

(2) Description of Related Art

Most currently-built rotorcraft are fitted with one or two free turbine engines. Power is then taken from a low pressure turbine referred to as a "free" turbine, which low pressure turbine is mechanically independent of the assembly of the engine that comprises the compressor and the high pressure stage, and in particular a high pressure turbine. The free turbine of a turbine engine generally operates at a speed of rotation lying in the range 20,000 revolutions per minute (rpm) to 50,000 rpm, so a speed-reduction gearbox is needed in the connection with the main rotor of the rotorcraft since its speed of rotation lies substantially in the range 200 rpm to 400 rpm: this is the main gearbox.

Thermal limitations of a turbine engine, and torque limitations of a main gearbox serve to define a performance envelope covering two normal utilization ratings for a turbine engine arranged on a single or twin-engined rotorcraft:

takeoff rating corresponding to a torque level for the gearbox and heating for the turbine engine that can be accepted for a limited length of time without significant degradation: this is the maximum takeoff power, written PMD by the person skilled in the art, that is usable for a continuous duration of five minutes for example and over an accumulated duration of thirty minutes in a single mission; and the maximum continuous rating during which, at no time, are the capabilities of the gearbox or the capabilities that result from the maximum acceptable continuous heating of the high pressure blades of the first stage of the turbine exceeded: this is the maximum continuous power, referred to as PMC by the person skilled in the art, and it can be used without any time limit, corresponding to about 90% of the PMD.

On a twin-engined rotorcraft, the performance envelope also covers emergency contingency ratings that are used only when only one of the two turbine engines has failed:

a first emergency rating during which the capabilities of the gearbox concerning its inlet stages and the thermal capabilities of the turbine engine are used to the maximum: this is referred to as super contingency rating and it is equal to about 112% to 120% of PMD, being usable for a continuous duration of thirty consecutive seconds at the most, for example, with this being possible three times during a flight, being referred to as PSU where OEI stands for "one engine inoperative". If PSU is used, then it is necessary to remove and overhaul the turbine engine;

a second emergency rating during which the capabilities of the gearbox concerning its inlet stages and the capabilities of the turbine engine are used very largely: this is referred to as maximum emergency power and is equal to about 105% to 110% of PMD, and is referred to as PMU or OEI2' by the person skilled in the art since it is usable for two consecutive minutes, for example; and a third emergency rating during which the capabilities of the gearbox concerning its inlet stages and the thermal capabilities of the turbine engine are used without damaging them: this is referred to as intermediate emergency power and is equal to PMD, being referred to by the person skilled in the art as continuous OEI or PIU or OEI2, since it can be used continuously for the remainder of the flight after failure of a turbine engine.

Consequently, the thermal and mechanical constraints and above all the phenomenon of turbine blade creep give rise to degradation of the turbine engine to a greater or lesser extent depending on the rating. In order to guarantee safe flight and obtain good performance, it is therefore essential to determine the maximum acceptable level of damage for a turbine engine.

Consequently, an overall utilization potential is evaluated for the turbine engine. Specifically, this amounts to defining a maximum number of flying hours known as time between overhauls (TBO), that the turbine engine is capable of performing since its most recent overhaul or its first use, depending on circumstances. Once TBO has been reached, the turbine engine is removed and then overhauled.

In the text below, and for convenience, the term "most recent overhaul of the turbine engine" is used to designate either the first use of the turbine engine or in fact the most recent overhaul thereof.

Furthermore, in order to obtain flying authorization in a given country for a rotorcraft, it is required that the performance envelope and the TBO of the turbine engine(s) of the rotorcraft to be certified by the official services in the country in question for a precise spectrum of utilizations. Such authorization is thus given only after complete certification tests have been completed, which are expensive.

Since these complete certification tests of a turbine engine are performed in order to justify a performance envelope associated with a TBO, it is not possible to use the turbine engine in some other performance envelope that differs from the initially authorized performance envelope without again performing complete certification tests, which are very expensive.

In addition, when the engine develops an intermediate power between the maximum continuous power PMC and the maximum takeoff power PMD, this intermediate power is subjected to the same limitation as the maximum takeoff power.

Likewise, when the engine is developing power lying between the intermediate emergency power and the maximum emergency power, that power is processed in the same manner as the maximum emergency power, being subjected to the same limitation as said maximum emergency power.

Under such circumstances, operation of the turbine engine would appear not to be optimized because of the discrete staging of engine ratings.

The state of the technical prior art includes document FR 2 878 288 in which it is proposed to modify the maximum number of flying hours in order to optimize use of the engine.

Furthermore, document FR 2 888 287 makes it possible to define a performance envelope that is an alternative to the initial performance envelope of the engine.

SUMMARY OF THE INVENTION

An object of the present invention is thus to propose a method and a device that enables the utilization of an engine to be optimized.

The present invention thus relates to a method of optimizing the use of an aircraft power plant having at least one engine operating within a performance envelope covering at least a first rating and a second rating, the first rating presenting a first power usable over a predetermined first time interval, and the second rating presenting a second power greater than the first power, the second power being usable continuously over a predetermined second time interval.

This method is remarkable in particular in that while the engine is developing a third power that is both greater than the first power and less than or equal to the second power, a potential first duration of utilization of continuous use of the second power is determined and displayed, e.g. in the form of a countdown, the first duration of utilization elapsing at a speed that is variable and that depends on said third power.

For an aircraft applying the method, the method does not imply changing the maximum number of flying hours TBO for which the engine is certified.

Furthermore, with an engine for an aircraft, e.g. a rotorcraft, the method is compatible with the certification rules in force insofar as it displays the first utilization duration that is potentially available for the second certified power. The flying manual of the aircraft is thus unchanged.

In the state of the art, when the engine is developing a third power, it is assumed that the engine is operating at the second rating that is usable for the second time interval.

In the invention, the pilot is informed of a first utilization duration that is available for the second power at said second rating, with this first utilization duration elapsing at a speed that is variable and different from the speed at which time elapses as defined by the international system (SI) for measuring time. This first utilization duration is thus a first counter that counts down so that the pilot can estimate the remaining duration of utilization at the second power.

Thus, one second of the first utilization duration is longer than or equal to the second defining the unit of time in said international system for measuring time.

When the third power is less than the second power, utilization of the third power does less damage to the engine than would utilization of the second power. The second time interval can therefore be increased, with this increase being represented by a first utilization duration for the second power that elapses more slowly than real time.

Thus, the invention makes it possible to use a third power that is less than the second power for a length of time that is longer than the second time interval. This method amounts to creating a new rating defined by the third power and by a third time interval, but without any need to modify the flying manual.

As a result, with the first power being the maximum continuous power PMC and the second power being the maximum takeoff power PMD, it is possible for example to hover or climb fast using a rotorcraft while developing engine power that lies between the first power PMC and the second power PMD for a length of time that is longer than the second time interval.

Similarly, on a twin-engined rotorcraft, it is possible to use an emergency rating lying between the second and third emergency ratings for a length of time that is optimized in order to become extricated from an awkward situation.

Furthermore, the method may include one or more of the following additional characteristics.

For example, in order to determine the first utilization duration:

during a preparatory stage, it is possible to establish a deterioration curve of an engine, the curve providing a coefficient of deterioration of the engine as a function of the value of a monitoring parameter of the engine, which parameter may be the temperature of the gas at the entry to the free turbine in a free turbine engine, and to establish a total damage level caused by a use of the second power during the second time interval, the total damage level being equal to the product of the second time interval multiplied by a targeted deterioration coefficient determined, with the help of the curve, by using the value of the monitoring parameter reached while the engine is developing the second power; and in real time, in flight, establishing and storing in memory the current deterioration coefficient of the engine, the first duration of utilization $\Delta T$ at each current instant being obtained using the following first relationship:

$$\Delta T = \frac{EP2 - \int_{T0}^{TPS} K(t) \cdot \delta t}{K2}$$

where:
K2 represents said targeted deterioration coefficient;
EP2 represents said total damage; and $$\int_{T0}^{TPS} K(t) \cdot \delta t$$

represents the integral of the current deterioration coefficient $K(t)$ as a function of time taken between a first instant T0 corresponding to passing from the first power towards the third power and said current instant TPS.

It can be understood that the first utilization duration is reinitialized at the end of utilization of the third power on starting the power plant, and also on each occasion power goes from the first power to the third power (non-accumulated time measurement that is reinitialized on each excursion).

Furthermore, the closer the third power comes to the second power, the faster the first duration of utilization elapses.

When the third power is less than the second power, one second of the first duration of utilization is longer than the unit of time measurement of the international system.

In contrast, when the third power is equal to the second power, the first duration of utilization elapses at the same speed as real time, with one second of the first utilization duration being equal to the time measurement unit of the international system.

Furthermore, the power plant may have two engines, with the first duration of utilization determined for each engine, and the smaller first duration of utilization may be displayed from among the first utilization duration of the first engine and the first utilization duration of the second engine.

In another aspect, a warning may be triggered when said first duration of utilization becomes less than a first predetermined threshold in order to attract the attention of an operator of a vehicle provided with the invention, e.g. an audible or visible alarm.

In another aspect, a second potential duration of continuous utilization of a third power developed at a current instant may be determined and displayed e.g. in the form of a countdown, the third power being both greater than the first power and also less than or equal to the second power, said second duration of utilization elapsing at a rate that is variable, depending on said third power.

Thus, it is possible to know how much time remains during which it is possible to use this third power without impacting the lifetime of the engine.

In order to determine the second utilization duration the following steps are performed:

during a preparatory stage, establishing a deterioration curve of an engine, the curve providing a coefficient of deterioration of the engine as a function of the value of a monitoring parameter of the engine, and establishing a total damage level caused by a use of the second power during the second time interval, the total damage level being equal to the product of the second time interval multiplied by a targeted deterioration coefficient determined, with the help of the deterioration curve, by using the value of the monitoring parameter reached while the engine is developing the second power; and in real time, in flight, establishing and storing in memory the current deterioration coefficient of the engine, the second duration of utilization at each current instant being obtained using the following first relationship:

$$\Delta T' = \frac{EP2 - \int_{T0}^{TPS} K(t) \cdot \delta t}{K(TPS)}$$

where:
K(TPS) represents said deterioration coefficient at the current instant;
EP2 represents said total damage; and $$\int_{T0}^{TPS} K(t) \cdot \delta t$$

represents the integral of the current deterioration coefficient K(t) as a function of time taken between a first instant T0 corresponding to passing from the first power towards the third power and the current instant TPS.

It can be understood that the second utilization duration is reinitialized at the end of using the third power on starting the power plant.

This second utilization duration is then a second counter that runs so as to allow the pilot to estimate the duration of utilization that remains for the third power.

In addition, for a power plant having two engines with the second utilization duration being determined for each engine, it is possible to display the utilization duration among the second utilization duration for the first engine and the second utilization duration for the second engine.

According to another aspect, it is possible to trigger a warning when the second utilization duration becomes less than a second given threshold in order to attract the attention of an operator of a vehicle fitted with the invention, e.g. an audible or visual alarm.

In another aspect, said second power can be used for an accumulated time TC2, longer than the second time interval, but in which each period of continuous utilization cannot exceed said second time interval, a third potential utilization duration, in accumulated and discontinuous time, of said second power is determined and displayed, e.g. in the form of a countdown, while the engine is developing during current utilization a third power that is both greater than the first power and also less than or equal to the second power, said third utilization duration being determined:

during a preparatory stage, by establishing a deterioration curve of an engine to provide a deterioration coefficient of the engine as a function of the value of a monitoring parameter of the engine, and by establishing an overall damage level caused by utilization of the second power during an accumulated time TC2, said overall damage being equal to the product of the accumulated time TC2 multiplied by a targeted deterioration coefficient determined, with the help of said curve, by using the value of the monitoring parameter reached while the engine is developing the second power;

at the end of each continuous utilization of the third power for an intermediate duration, by storing an intermediate damage level $E_i$ in memory, said level being determined using the following integral of the deterioration coefficient K(t) as a function of time during said intermediate duration:

$$Ei = \int_0^{di} K(t) \cdot \delta t$$

in real time during the flight, establishing and storing in memory the current deterioration coefficient of the engine, the third duration of utilization $\Delta T''$ at each current instant being obtained by using the following third relationship:

$$\Delta T'' = \frac{EPC2 - \left[\sum_{i=1}^{n-1} Ei + \int_{T0}^{TPS} K(t) \cdot \delta t\right]}{K2}$$

where:
K2 represents said targeted deterioration coefficient;
EPC2 represents said overall damage level;

$$\sum_{i=1}^{n-1} Ei$$

represents the stored accumulated intermediate damage acquired during utilizations of the third power preceding the current utilization; and $$\int_{T0}^{TPS} K(t) \cdot \delta t$$

represents the integral of the current deterioration coefficient K(t) as a function of time taken between a first instant T0 corresponding to passing from the first power to the third power during the current utilization and said current instant TPS.

It can be understood that the intermediate level of damage and the third utilization duration $\Delta T''$ are reinitialized on starting the power plant.

In addition to a method, the invention also provides piloting means applying the method.

According to the invention, piloting means for an aircraft power plant having at least one engine operating within a performance envelope covering at least a first rating and a second rating, said first rating presenting a first power usable over a predetermined first time interval, said second rating presenting a second power greater than said first power, the second power being usable continuously over a predetermined second time interval, the second power possibly also being usable over an accumulated time interval that is longer than the second time interval but for which each period of utilization must be shorter than the second time interval, which means are remarkable in particular in that they comprise:

determination means for determining a first possible continuous utilization duration of the second power when the engine is developing a third power that is both greater than the first power and less than or equal to the second power, the determination means determining the first utilization duration:

with the help of a deterioration curve of an engine, the curve providing a coefficient of deterioration of the engine as a function of the value of a monitoring parameter of the engine, and establishing a total damage level caused by a use of the second power during the second time interval, the total damage level being equal to the product of the second time interval multiplied by a targeted deterioration coefficient determined, with the help of the curve, by using the value of the monitoring parameter reached while the engine is developing the second power; and in real time, in flight, establishing and storing in memory the current deterioration coefficient of the engine, the first duration of utilization at each current instant being obtained by the determination means using the following first relationship:

$$\Delta T = \frac{EP2 - \int_{T0}^{TPS} K(t) \cdot \delta t}{K2}$$

where:

K2 represents the targeted deterioration coefficient;

EP2 represents the total damage; and $$\int_{T0}^{TPS} K(t) \cdot \delta t$$

represents the integral of the current deterioration coefficient K(t) as a function of time taken between a first instant T0 corresponding to passing from the first power towards the third power and the current instant TPS; and display means co-operating with the determination means to display the remainder of the first utilization duration.

The piloting means may be incorporated in a first limitation instrument of an aeroengine, in particular.

BRIEF DESCRIPTION OF THE DRAWING

The invention and its advantages appear in greater detail in the context of the following description of implementations given by way of illustration with reference to the accompanying figures, in which.

Elements present in more than one of the figures are given the same references in each of them.

DETAILED DESCRIPTION OF THE PREFERRED EMBODIMENT

Figure 1:
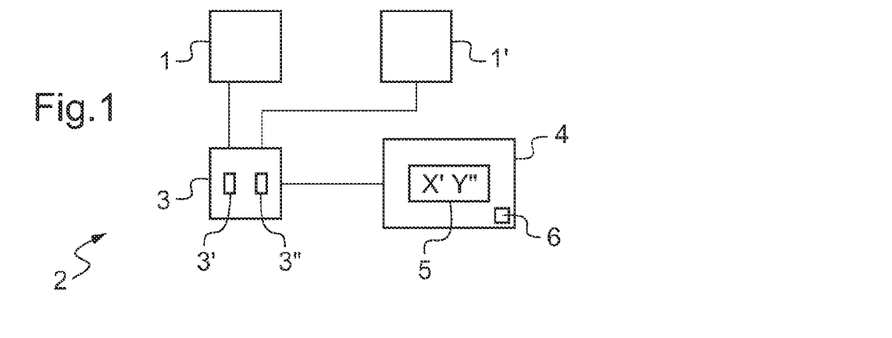
FIG. 1 is a diagram explaining the piloting means of the invention.

FIG. 1 shows piloting means 2 for optimizing the use of engines 1, 1' in a power plant of an aircraft, for example.

Each engine is dimensioned and certified to operate in a plurality of staged operating ratings. For example, each engine may operate in a first rating in which the engine may develop a first power P1 during a first time interval D1, e.g. an infinite time interval, and in a second rating during which the engine may develop a second power P2 during a limited second time interval D2 on a continuous basis.

For example, each engine is a turbine engine, with the first rating being the maximum continuous power rating during which the engine develops a maximum continuous power PMC, with the second rating being a takeoff rating during which the engine develops a maximum takeoff power PMD for a maximum of 5 minutes continuously, for example.

With a power plant such as that shown diagrammatically that has two engines, the first rating may be the emergency third rating in which the engine develops an intermediate emergency power for a one engine inoperative (OEI) power level without time limit, the second rating may be the second emergency rating during which the engine develops a maximum emergency power that is usable for two consecutive minutes, for example (OEI2').

Under such circumstances, the first power P1 may be the maximum continuous power PMC, in which case the second power P2 is the maximum takeoff power PMD, or indeed the first power P1 may be an intermediate emergency power OEI, in which case the second power P2 is the maximum emergency power OEI2'.

The piloting means 2 may include determination means 3 for determining a first possible duration of utilization ΔT that is continuously usable for the second power P2, while the engine is developing a third power P3 greater than the first power P1 and less than or equal to the second power P2. The determination means 3 may optionally be provided with a calculation member 3' making use of a memory 3" for establishing the first duration of utilization in application of precise criteria.

Furthermore, the piloting means 2 possess display means 4 for presenting on a screen 5 the first duration of utilization. The display means 4 optionally include warning means 6 for triggering a warning when the first duration of utilization is less than a first predetermined threshold.

For a power plant having only one engine, the display means then display in particular the first duration of utilization ΔT, this first duration of utilization ΔT running at a speed that varies as a function of the third power P3 being developed by the engine 1.

For a power plant having a plurality of engines, the determination means 3 determine the first duration of utilization ΔT associated with each engine, the display means then displaying either the first duration of utilization ΔT of each engine, or else the smallest first duration of utilization ΔT.

It should be observed that the piloting means 2 shown include single determination means 3 common to both engines. Nevertheless, it should be understood that the piloting means 2 could include respective determination means for each engine, for example.

Figure 2:
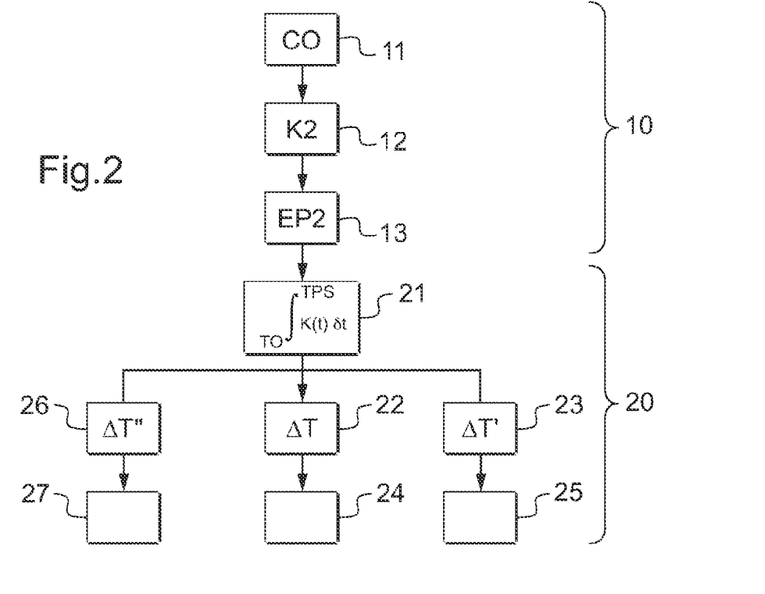
FIG. 2 is a diagram explaining the method of the invention.

FIG. 2 explains the optimization method of the invention.

During a preparatory stage 10, in a first step 11, a deterioration curve CO of an engine is established, which deterioration curve CO provides a deterioration coefficient K of the engine as a function of the value of a monitoring parameter of said engine.

Any other similar means, e.g. a data table, suitable for giving said deterioration coefficient as a function of the value of a monitoring parameter of the engine can be envisaged.

By way of example, the curve may be stored in the memory 3" of the determination means 3.

In addition, when the engine optionally includes a high pressure turbine located upstream from a free turbine, the monitoring parameter may be the temperature of the gas at the inlet to the high pressure turbine, known to the person skilled in the art as the turbine entry temperature (TET).

The blades of the high pressure turbine of the turbine engine are subjected to centrifugal force and to the temperature TET. Above a certain threshold, the material constituting the blades is the subject of "creep" and the blades are then subject to deformation, namely to an increase in the length of the blades. Thus, the blades run the risk of touching the casing of the high pressure turbine and of thus being degraded. The temperature TET is thus associated directly with degradation of the turbine engine.

Nevertheless, since the temperature TET is very difficult to measure because of its relatively non-uniform nature, the monitoring parameter is preferably the temperature of the gas at the entry to the free turbine, known to the person skilled in the art as T4. Since this temperature is a good representation of the temperature TET, it is representative of the degradation of the turbine engine.

The monitoring parameter may be the torque developed by the engine or indeed the speed of rotation of a rotary gas generator of the engine, or it may be a function of a plurality of parameters such as the gas temperature at the entry to the free turbine modulated by the outside temperature and the outside pressure, for example.

Figure 3:
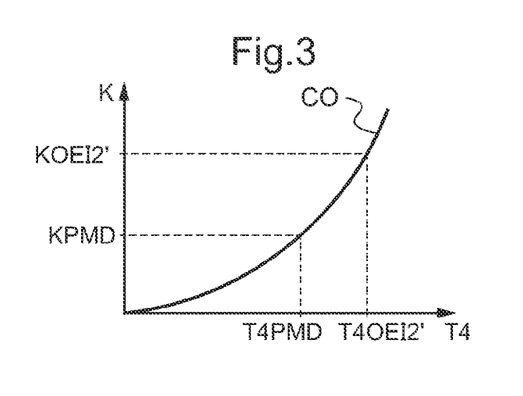
FIG. 3 is a diagram showing a deterioration curve.

FIG. 3 is a graph plotting a curve CO that determines a deterioration coefficient K. The value of a monitoring parameter of the turbine engine is plotted along the abscissa axis and the value of the deterioration coefficient K is plotted up the ordinate axis. It should be observed that the curve CO may be obtained by testing on each model of engine.

Preferably, when the turbine engine has a free turbine, the monitoring parameter is the temperature T4 of the gas at the entry to the free turbine. This temperature T4 is a good representation of the state of the turbine engine since damage thereto is caused mainly by excessively high temperatures. The greater the temperature of the turbine engine, the more it is degraded. This observation also lies behind the exponential shape of the curve CO.

The graph shows the value of the monitoring parameter T4PMD and the associated deterioration coefficient KPMD relating to takeoff rating. Under such circumstances, the second power P2 gives rise to a deterioration coefficient K2 that is equal to the associated deterioration coefficient KPMD when said second power P2 is the takeoff power TOP.

Similarly, the graph shows the value of the monitoring parameter T4OEI2' and the associated deterioration coefficient KOEI2' relating to the second emergency rating. Under such circumstances, the power P2 induces a deterioration coefficient K2 equal to said associated deterioration coefficient KOEI2' when said second power P2 is the maximum emergency power OEI2'.

With reference to FIG. 2, during a second step 12, the deterioration coefficient K2 is determined for at least one second possible rating of the operating envelope of the engine, e.g. the above-mentioned deterioration coefficient KPMD or KOEI2'.

With reference to FIG. 2, during a third step 13, for at least one second possible rating of the operating envelope of the engine, a total damage level EP2 caused by use of the second power P2 of the second rating during the second time interval D2 is established, with this total damage EP2 being equal to the product of the second time interval D2 multiplied by a targeted deterioration coefficient K2 as determined with the help of said deterioration curve CO, by using the value reached by said monitoring parameter when the engine is developing said second power P2, i.e.:

$$EP2 = D2*K2$$

For example, total damage ETOP associated with takeoff rating is established, this total damage ETOP being given by:

$$EPMD = DPMD*KPMD$$

where:

EPMD represents the total damage EP2 generated by using the maximum takeoff power during a second time interval D2, e.g. 5 minutes;

DPMD represents said second time interval D2 during which the takeoff maximum power is used continuously; and KPMD represents the targeted deterioration coefficient obtained using the deterioration curve CO.

Similarly, total damage EOEI2' associated with the second emergency rating is determined, this total damage EOEI2' being given by;

$$EOEI2' = DOEI2'*KOEI2'$$

where:

EOEI2' represents the total damage EP2 generated by using the emergency maximum power during a second time interval D2, e.g. 2 minutes;

DOEI2' represents said second time interval D2 during which the maximum emergency power is used continuously; and KOEI2' represents the targeted deterioration coefficient obtained using the deterioration curve CO.

The deterioration coefficient K2 of each rating and the total damage EP2 of each rating may be stored in the memory 3" of the determination means 3, for example.

In real time, and during a stage of flight 20, when the engine develops a third power P3 greater than the first power P1 of a first rating and less than or equal to the second power P2 of a second rating, the piloting means 2 calculate and display the first duration of utilization $\Delta T$.

Thus, the determination means 3 receive the current value of the monitoring parameter of the engine and establish the current deterioration coefficient K(t) of the engine using said current value of the monitoring parameter and the deterioration curve CO. The determination means store the current deterioration coefficient K(t) as from the first instant T0 corresponding to going from the first power P1 towards the third power P3.

Figure 4:
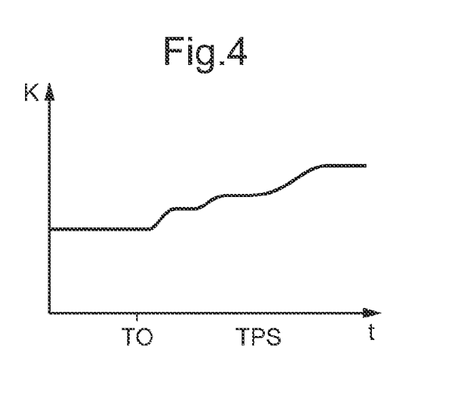
FIG. 4 is a diagram showing the deterioration coefficient as a function of time.

FIG. 4 shows an example of how the current deterioration coefficient K(t) of an engine might vary between this first instant T0 and the current instant TPS.

With reference to FIG. 2, during a first calculation step 21, the determination means 3 calculate in real time the time integral of the current deterioration coefficient K(t) between the first instant T0 and the current instant TPS.

After that, during a second calculation step 22, the determination means determine the first duration of utilization $\Delta T$ at each current instant TPS using the following first relationship:

$$\Delta T = \frac{EP2 - \int_{T0}^{TPS} K(t) \cdot \delta t}{K2}$$

where:

K2 represents said targeted deterioration coefficient of the second rating in question;

EP2 represents said total damage of the second rating in question; and $$\int_{T0}^{TPS} K(t) \cdot \delta t$$

represents the integral of the current deterioration coefficient K(t) as a function of time taken between a first instant T0 corresponding to passing from the first power P1 towards the third power P3 and said current instant TPS.

When the second rating is takeoff rating, then:

$$\Delta T = \frac{EPMD - \int_{T0}^{TPS} K(t) \cdot \delta t}{KPMD}$$

Similarly, when the second rating is the second emergency rating, then:

$$\Delta T = \frac{EPOEI2' - \int_{T0}^{TPS} K(t) \cdot \delta t}{KOEI2'}$$

Thereafter, during a display step 24, the determination means 3 causes the first duration of utilization ΔT to be displayed in the form of a countdown at a rate that varies as a function of the third power P3.

The closer the third power P3 comes to the second power P2, the greater the speed at which the first duration of utilization ΔT elapses, with one second of the first duration of utilization ΔT nevertheless being longer than the time measurement unit of the international system. It should be recalled that since the thirteenth general conference on weights and measures, the second that represents said time measurement unit is no longer defined relative to a year, but relative to a property of matter: with this unit being defined since 1967 in the international system in the following terms: "The duration of 9,192,631,770 periods of the radiation corresponding to the transition between the two hyperfine levels F=3 and F=4 of the 6S½ ground state of the cesium-133 atom".

In order to ensure that the counter giving the second duration of utilization ΔT indicates zero on starting from two minutes, it may be necessary for three minutes to elapse, for example.

In contrast, when the third power P3 is equal to the second power P2, the first duration of utilization ΔT elapses at the same speed as real time, with one second of the first duration of utilization ΔT being equal to the time measurement unit of the international system.

In parallel, during a step 23, the piloting means 2 determine and display in the form of a countdown a second duration of utilization ΔT' that may be performed continuously at a third power P3 being developed at a current instant TPS, the third power P3 being firstly greater than the first power P1 and secondly less than or equal to the second power P2, the second duration of utilization ΔT' depending on the third power P3.

In order to determine said second duration of utilization ΔT', in real time and in flight, the determination means 3 determine the second duration of utilization ΔT' at each current instant TPS using the following second relationship:

$$\Delta T' = \frac{EP2 - \int_{T0}^{TPS} K(t) \cdot \delta t}{K(TPS)}$$

where:

K(TPS) represents said deterioration coefficient at the current instant;

EP2 represents said total damage; and $$\int_{T0}^{TPS} K(t) \cdot \delta t$$

represents the integral of the current deterioration coefficient K(t) as a function of time taken between a first instant T0 corresponding to passing from the first power P1 towards the third power P3 and said current instant TPS.

Thereafter, during a display step 25, the determination means 3 require the second duration of utilization ΔT' to be displayed in the form of a countdown that varies as a function of the third power P3.

When the power plant has two engines 1, 1', the second duration of utilization ΔT' is determined for each of the engines 1, 1', and the smaller of the second durations of utilization ΔT' is displayed.

Finally, the piloting means 2 may trigger a warning when the second duration of utilization ΔT' becomes less than a second predetermined threshold.

In addition, during a step 26, the piloting means 2 determine and display in the form of a countdown a third duration of utilization ΔT" of the second power that is possible in accumulated and discontinuous manner while the engine is developing a third power that is both greater than the first power and less than or equal to the second power.

During a preparatory stage, using the deterioration curve CO, overall damage EPC2 is established due to use of the second power during an accumulated time interval TC2, this overall damage being equal to the product of the accumulated second time interval multiplied by the targeted deterioration coefficient as determined with the help of the deterioration curve by using the value of the monitoring parameter reached while the engine is developing the second power.

Furthermore, excursions at third powers lying between the first power and the second power are discrete and they are numbered using an index i. The intermediate damage generated during each excursion of an intermediate duration di is equal to:

$$Ei = \int_{0}^{di} K(t) \cdot \delta t$$

Each intermediate damage Ei is established and stored during the flight by the determination means 3.

Under such circumstances, at each current use of the third power, taking place after earlier excursions that have caused intermediate damage to be stored in memory, the determination means 3 establish and store the current deterioration coefficient of the engine, and then determine a third duration of utilization ΔT" at each current instant using the following relationship:

$$\Delta T'' = \frac{EPC2 - \left[\sum_{i=1}^{n-1} Ei + \int_{T0}^{TPS} K(t) \cdot \delta t\right]}{K2}$$

where:

K2 represents said targeted deterioration coefficient;

EPC2 represents said overall damage under the effect of using the second power during an accumulated duration TC2;

$$\sum_{i=1}^{n-1} Ei$$

represents the accumulated intermediate damage stored prior to the current utilization, i.e. during the (n−1) excursions at powers greater than the first power and less than or equal to the second power; and $$\int_{T0}^{TPS} K(t) \cdot \delta t$$

represents the integral of the current deterioration coefficient K(t) as a function of time taken between a first instant T0 corresponding to the beginning of the current utilization, i.e. the n$^{th}$ passage from the first power to the third power and said current instant TPS.

Naturally, the present invention may be subjected to numerous variations as to its implementation. Although several implementations are described, it will readily be understood that it is not conceivable to identify exhaustively all possible implementations. It is naturally possible to envisage replacing any of the means described by equivalent means without going beyond the ambit of the present invention.

What is claimed is:

1. A method of optimizing the use of an aircraft power plant having at least one engine, the method comprising:
    operating the engine within a performance envelope covering at least a first rating and a second rating, the first rating presenting a first power (P1) which the engine can develop over a predetermined first time interval (D1), the second rating presenting a second power (P2) greater than the first power (P1) which the engine can develop continuously over a predetermined second time interval (D2);
    operating the engine to develop a third power (P3) that is both greater than the first power (P1) and less than or equal to the second power (P2);
    while the engine is developing the third power (P3), determining a potential first duration of utilization (ΔT) of the engine to develop continuously the second power (P2) which takes into account engine deterioration caused while the engine is developing the third power (P3) relative to engine deterioration which would be caused if the engine developed the second power (P2) instead of the third power (P3), and displaying on a display the first duration of utilization (ΔT) in the form of a countdown which elapses at a speed that is variable and that depends on the third power (P3) relative to the second power (P2) such that a pilot can be apprised from the countdown of a remaining duration that the engine can be operated to develop continuously the second power (P2);
    controlling the operation of the engine using information provided by the countdown, wherein time between overhauls (TBO) for which the engine is certified remains unchanged upon completion of the method;
    wherein a second potential duration of continuous utilization (ΔT') of a third power (P3) developed at a current instant (TPS) is determined and displayed, the third power (P3) being both greater than the first power (P1) and also less than or equal to the second power (P2), the second duration of utilization (ΔT') depending on the third power (P3);
    wherein in order to determine the second duration of utilization (ΔT'), the following steps are performed:
    during a preparatory stage, establishing a deterioration curve (CO) of an engine, the curve providing a coefficient of deterioration (K) of the engine as a function of the value of a monitoring parameter (T4) of the engine, and establishing a total damage level (E2) caused by a use of the second power (P2) during the second time interval (D2), the total damage level (E2) being equal to the product of the second time interval (D2) multiplied by a targeted deterioration coefficient (K2) determined, with the help of the curve (CO), by using the value of the monitoring parameter (T4) reached while the engine is developing the second power (P2); and
    in real time, in flight, establishing and storing in memory the current deterioration coefficient (K(t)) of the engine, the second duration of utilization (ΔT') at each current instant (TPS) being obtained using the following first relationship:

$$\Delta T' = \frac{EP2 - \int_{T0}^{TPS} K(t) \cdot \delta t}{K2}$$

where:

K(TPS) represents the deterioration coefficient at the current instant;

EP2 represents the total damage; and $$\int_{T0}^{TPS} K(t) \cdot \delta t$$

represents the integral of the current deterioration coefficient K(t) as a function of time taken between a first instant T0 corresponding to passing from the first power (P1) towards the third power (P3) and the current instant TPS.

2. A method of optimizing the use of an aircraft power plant having at least one engine, the method comprising:
    operating the engine within a performance envelope covering at least a first rating and a second rating, the first rating presenting a first power (P1) which the engine can develop over a predetermined first time interval (D1), the second rating presenting a second power (P2) greater than the first power (P1) which the engine can develop continuously over a predetermined second time interval (D2);

operating the engine to develop a third power (P3) that is both greater than the first power (P1) and less than or equal to the second power (P2);

while the engine is developing the third power (P3), determining a potential first duration of utilization (ΔT) of the engine to develop continuously the second power (P2) which takes into account engine deterioration caused while the engine is developing the third power (P3) relative to engine deterioration which would be caused if the engine developed the second power (P2) instead of the third power (P3), and displaying on a display the first duration of utilization (ΔT) in the form of a countdown which elapses at a speed that is variable and that depends on the third power (P3) relative to the second power (P2) such that a pilot can be apprised from the countdown of a remaining duration that the engine can be operated to develop continuously the second power (P2);

controlling the operation of the engine using information provided by the countdown, wherein time between overhauls (TBO) for which the engine is certified remains unchanged upon completion of the method;

wherein when the second power (P2) can be used for an accumulated time TC2, a third potential utilization duration (ΔT''), in accumulated and discontinuous time, of the second power (P2) is determined and displayed while the engine is developing during current utilization a third power (P3) that is both greater than the first power (P1) and also less than or equal to the second power (P2), the third utilization duration (ΔT'') being determined:

during a preparatory stage, by establishing a deterioration curve of an engine to provide a deterioration coefficient of the engine as a function of the value of a monitoring parameter of the engine, and by establishing an overall damage level caused by utilization of the second power during an accumulated time TC2, the overall damage being equal to the product of the accumulated time TC2 multiplied by a targeted deterioration coefficient determined, with the help of the curve, by using the value of the monitoring parameter reached while the engine is developing the second power;

at the end of each continuous utilization of the third power for an intermediate duration, by storing an intermediate damage level $E_i$ in memory, the level being determined using the following integral of the deterioration coefficient K(t) as a function of time during the intermediate duration:

$$Ei = \int_0^{di} K(t) \cdot \delta t$$

in real time during the flight, establishing and storing in memory the current deterioration coefficient of the engine, the third duration of utilization ΔT'' at each current instant being obtained by using the following third relationship:

$$\Delta T'' = \frac{EPC2 - \left[\sum_{i=1}^{n-1} Ei + \int_{T0}^{TPS} K(t) \cdot \delta t\right]}{K2}$$

where:
K2 represents the targeted deterioration coefficient;
EPC2 represents the overall damage level;

$$\sum_{i=1}^{n-1} Ei$$

represents the stored accumulated intermediate damage acquired during utilizations of the third power preceding the current utilization; and $$\int_{T0}^{TPS} K(t) \cdot \delta t$$

represents the integral of the current deterioration coefficient K(t) as a function of time taken between a first instant T0 corresponding to passing from the first power to the third power during the current utilization and the current instant TPS.

3. Piloting means for an aircraft power plant having at least one engine operating within a performance envelope covering at least a first rating and a second rating, the first rating presenting a first power (P1) usable over a predetermined first time interval (D1), the second rating presenting a second power (P2) greater than the first power (P1), the second power (P2) being usable continuously over a predetermined second time interval (D2), said piloting means comprising:

a monitor for physically monitoring a parameter (T4) of the engine while the engine is operating to develop a power;

determination means for determining a first possible continuous utilization duration (ΔT) of the second power (P2) when the engine is developing a third power (P3) that is both greater than the first power (P1) and less than or equal to the second power (P2), the determination means determining the first utilization duration (ΔT):

with the help of a deterioration curve (CO) of an engine, the curve providing a coefficient of deterioration (K) of the engine as a function of the value of the monitoring parameter (T4) of the engine, and establishing a total damage level (E2) caused by a use of the second power (P2) during the second time interval (D2), the total damage level (E2) being equal to the product of the second time interval (D2) multiplied by a targeted deterioration coefficient (K2) determined, with the help of the curve (CO), by using the value of the monitoring parameter reached while the engine is developing the second power (P2); and in real time, in flight, establishing and storing in memory the current deterioration coefficient (K(t)) of the engine, the first duration of utilization (ΔT) at each current instant (TPS) being obtained by the determination means using the following first relationship:

$$\Delta T = \frac{EP2 - \int_{T0}^{TPS} K(t) \cdot \delta t}{K2}$$

where:
K2 represents the targeted deterioration coefficient;
EP2 represents the total damage; and $$\int_{T0}^{TPS} K(t) \cdot \delta t$$

represents the integral of the current deterioration coefficient K(t) as a function of time taken between a first instant T0 corresponding to passing from the first power (P1) towards the third power (P3) and the current instant TPS; and display means co-operating with the determination means to display on a display to a pilot the first utilization duration (ΔT) in the form of a countdown which elapses at a variable speed dependent on the third power (P3) relative to the second power (P2) such that when controlling the operation of the engine the pilot can be apprised from the countdown of a remaining duration that the engine can be operated to develop continuously the second power (P2).

4. A method of optimizing the use of an aircraft power plant having at least one engine, the method comprising:

operating the engine within a performance envelope covering at least a first rating and a second rating, the first rating presenting a first power (P1) which the engine can develop over a predetermined first time interval (D1), the second rating presenting a second power (P2) greater than the first power (P1) which the engine can develop continuously over a predetermined second time interval (D2);

operating the engine to develop a third power (P3) that is both greater than the first power (P1) and less than or equal to the second power (P2);

while the engine is developing the third power (P3), determining a potential first duration of utilization (ΔT) of the engine to develop continuously the second power (P2), and displaying on a display the first duration of utilization (ΔT) in the form of a countdown which elapses at a speed that is variable and that depends on the third power (P3) relative to the second power (P2) such that a pilot can be apprised from the countdown of a remaining duration that the engine can be operated to develop continuously the second power (P2); and controlling the operation of the engine using information provided by the countdown;

wherein in order to determine the first duration of utilization (ΔT), the following steps are performed:

during a preparatory stage, establishing a deterioration curve (CO) of an engine, the curve providing a coefficient of deterioration (K) of the engine as a function of the value of a monitoring parameter (T4) of the engine, and establishing a total damage level (E2) caused by a use of the second power (P2) during the second time interval (D2), the total damage level (E2) being equal to the product of the second time interval (D2) multiplied by a targeted deterioration coefficient (K2) determined, with the help of the curve (CO), by using the value of the monitoring parameter (T4) reached while the engine is developing the second power (P2); and in real time, in flight, establishing and storing in memory the current deterioration coefficient (K(t)) of the engine, the first duration of utilization (ΔT) at each current instant (TPS) being obtained using the following first relationship:

$$\Delta T = \frac{EP2 - \int_{T0}^{TPS} K(t) \cdot \delta t}{K2}$$

where:
K2 represents the targeted deterioration coefficient;
EP2 represents the total damage; and $$\int_{T0}^{TPS} K(t) \cdot \delta t$$

represents the integral of the current deterioration coefficient K(t) as a function of time taken between a first instant T0 corresponding to passing from the first power (P1) towards the third power (P3) and the current instant TPS.

* * * * *